United States Patent
Ryan et al.

[11] Patent Number: 6,045,272
[45] Date of Patent: *Apr. 4, 2000

[54] POSITIONING SYSTEM FOR AN OBSERVATION DEVICE USING A TENSIONED FILAMENT AND LOCATOR BALL

[75] Inventors: Christopher J. Ryan, Lancaster; Richard R. Wright, Reinholds, both of Pa.

[73] Assignee: Philips Electronics N.A. Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/877,047

[22] Filed: Jun. 17, 1997

[51] Int. Cl.$^7$ ...................................................... G03B 17/00
[52] U.S. Cl. ........................................... 396/428; 74/89.22
[58] Field of Search .................................... 396/419, 427, 396/428; 254/372, 407; 474/154; 74/89.22

[56] References Cited

U.S. PATENT DOCUMENTS

| | | | |
|---|---|---|---|
| 441,359 | 11/1890 | Douglas | 474/153 |
| 3,041,887 | 7/1962 | Zumbrunnen | 474/154 |
| 4,424,619 | 1/1984 | Conrad | 474/154 X |

*Primary Examiner*—Howard B. Blankenship

[57] ABSTRACT

A cable drive apparatus is presented which has minimal cable slippage and backlash. Such a cable drive is particularly well suited for systems requiring accurate positioning and repositioning capabilities, such as motorized camera orientation systems. To achieve minimal slippage on a cable driven pulley, one or more positioning balls are located at fixed locations on the cable, and corresponding positioning holes are located on either pulley. Tensioning means are also provided to remove slack, to minimize the backlash which may result from the stretching of the cable over time. A two pulley system is presented wherein the cable is fixedly attached to one pulley, travels over the other pulley which has the slippage constraining positioning holes, and then to tensioning means which also fixedly attached to the first pulley.

7 Claims, 6 Drawing Sheets

POSITIONING SYSTEM FOR AN OBSERVATION DEVICE USING A TENSIONED FILAMENT AND LOCATOR BALL

BACKGROUND OF THE INVENTION

1. Field of the Invention

This invention relates to a cable and pulley arrangement that provides for minimal slippage of the cable about the pulley. It is particularly well suited for applications requiring accurate and repeatable movements of devices attached to such pulleys, such as motorized and automated Pan/Tilt/Zoom Cameras with predefined fields of view.

2. Discussion of Related Art

Pulley and Cable arrangements are often used to control the movement of a device connected to one pulley via the controlled movement of another pulley. For example, a security camera's field of view can be adjusted in the horizontal or vertical direction by controlling one or more motors that are connected by pulley and cable to a movable platform upon which the camera is attached. Another example is the manual rotation of a wheel to effect the rotation of another device, such as the rudder of a boat.

To maintain a correspondence between the rotation of the driving pulley and the driven pulley, the cable which is routed about the pulleys is maintained under tension, and the resultant friction forces a relatively fixed relation between each pulley and the cable. Often, due to the nature of the construction of the cable, for example as a braided filament of finer strands, the frictional forces are not equivalent in both directions of rotation of the pulleys. This can result in a gradual creeping of the cable in the direction of lesser frictional force, such that the correspondence between the driving and driven pulleys is no longer maintained. To reduce the slippage in half, traditional devices often comprise a cable that is fixedly attached to one pulley, and frictionally held to the other. Fixedly attaching the cable to both pulleys is not effective, for it introduces hysteresis, or backlash, as the cables stretch over time and the driving pulley must initially take up the slack before a movement occurs on the driven pulley. Cable stretching also allows for overshoot, as the inertia of the driven object causes it to continue to rotate when the driving motor stops. To compensate for cable stretch, the driving and driven pulleys are typically maintained under high tension, using for example, spring mounted pulleys.

Alternatively, to assure a proper and repeatable correspondence between the rotation of the driving pulley and the driven pulley, a modified pulley and cable arrangement may comprise a toothed wheel and a chain. When the driving pulley is rotated, the chain holds an absolute position relative to the wheel because of the interlocking of the chain and the teeth of the wheel. Such a chain driven apparatus, however, typically exhibits the aforementioned hysteresis, or backlash. To reduce the hysteresis caused by the chain linkage, hybrid devices typically comprise a chain and toothed gear on the driving pulley, and a fixedly attached cable on the driven pulley.

To overcome the hysteresis of a chain, or the slippage of a filament, or both, the static tension on the chain or cable must be high. To accommodate the forces produced by the high tension between pulleys, the supporting structures, holding the pulleys apart and maintaining the tension, must be reinforced. This reinforcement adds additional weight and cost to the apparatus, a weight and cost which could be reduced by minimizing the need for high tension between the pulleys.

SUMMARY OF THE INVENTION

It is an object of this invention to provide a means for maintaining a correspondence between the orientation of a drive pulley and a driven pulley. It is a further object of this invention to minimize the slippage of a pulley and cable arrangement. It is a further object of this invention to minimize the hysteresis, or backlash, of a pulley and cable arrangement. It is a further object of this invention to minimize the hysteresis and slippage of a pulley and cable arrangement without introducing significant additional costs.

These objectives have been realized by fixedly attaching a locator ball on the cable, and a corresponding locator hole on the pulley. Through the interaction of the ball and the hole, a significant frictional advantage can be achieved, without requiring excessively high tension between the pulleys. Further advantages can be achieved by combining this locator ball approach with a fixedly attached cable approach, as will be discussed below.

DESCRIPTION OF THE PREFERRED EMBODIMENTS

Figure 1A:
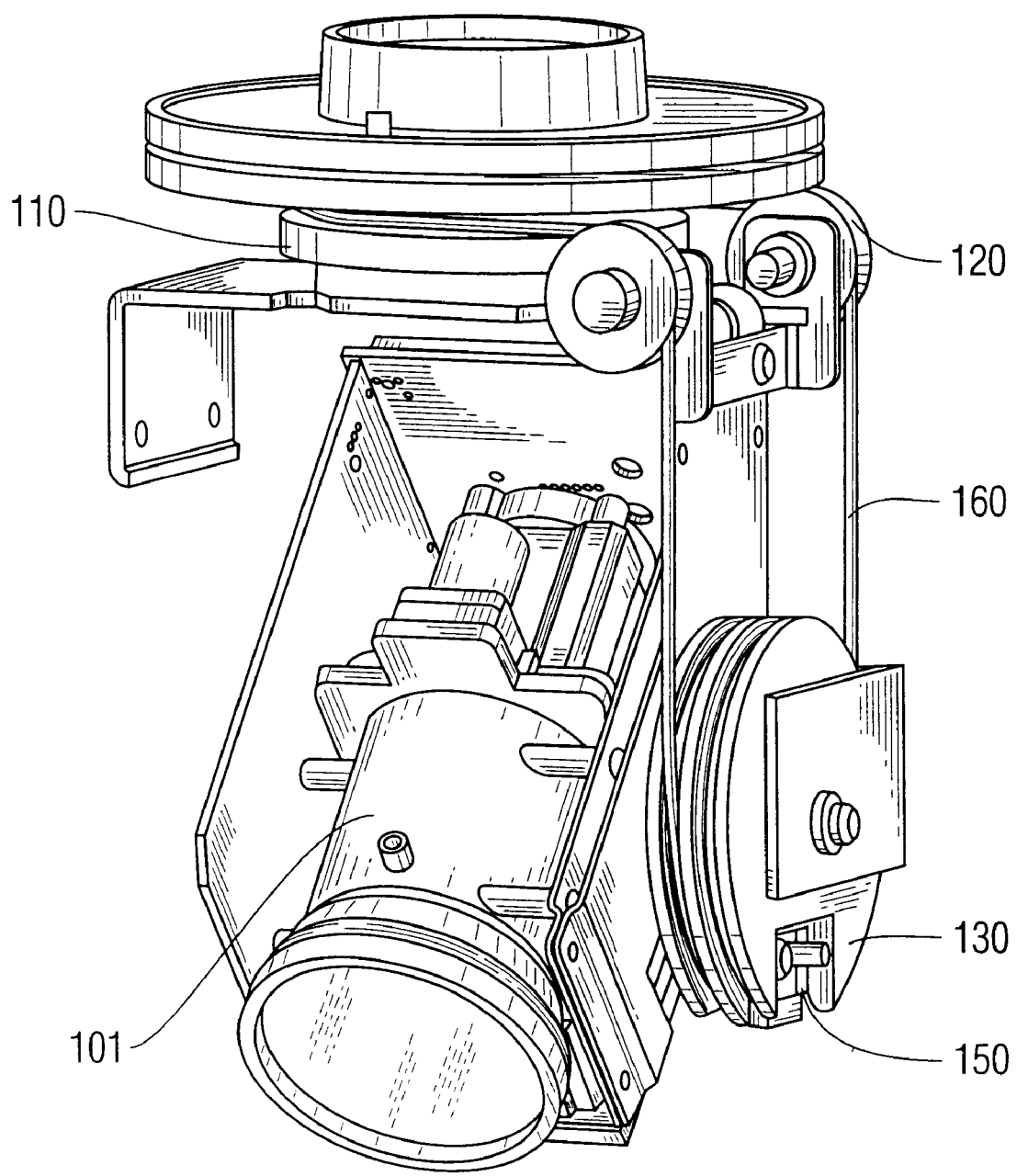
FIGS. 1A and 1B shows a cable drive for a Pan/Tilt/Zoom camera.
Figure 1B:
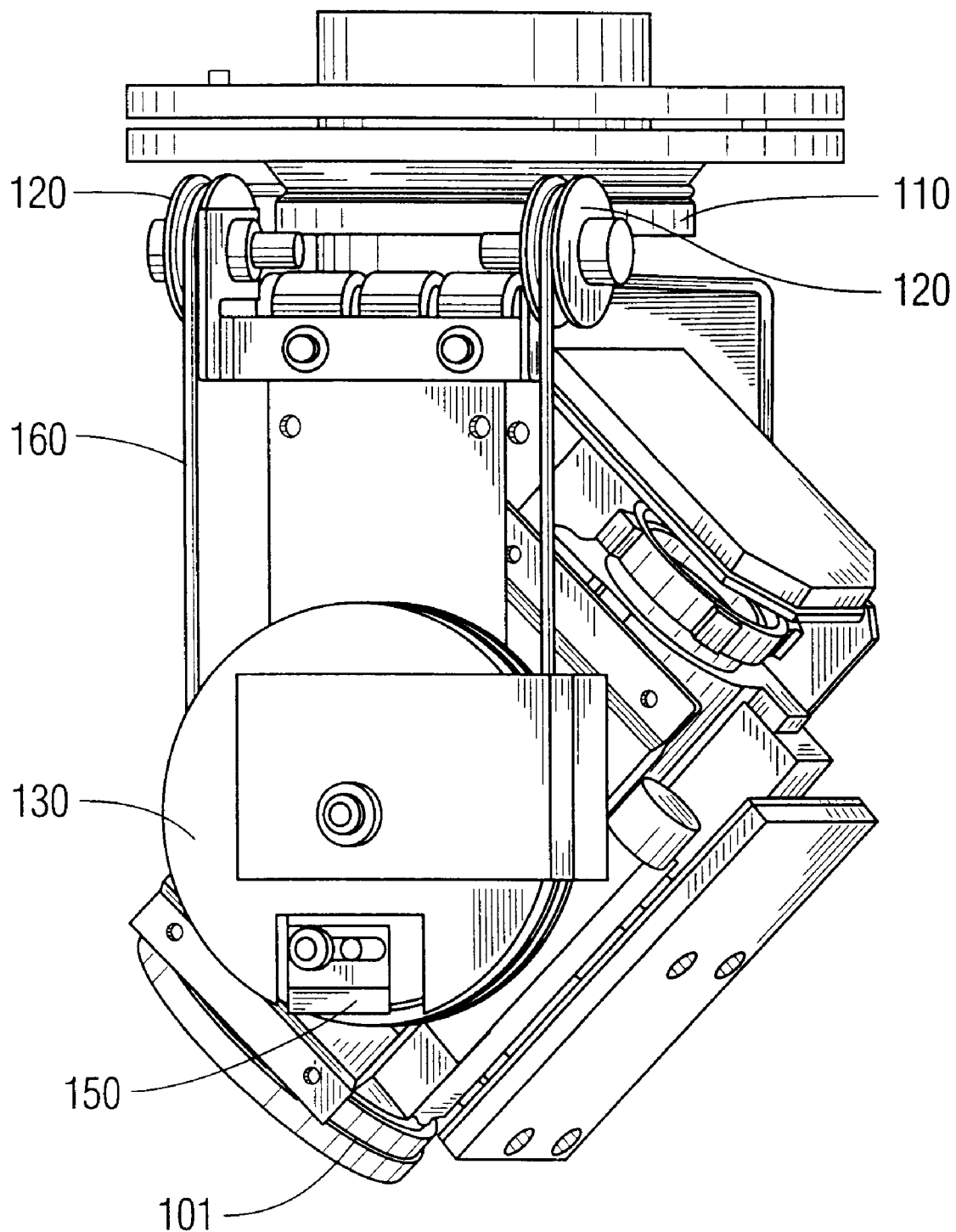

FIGS. 1A and 1B shows a cable drive for a Pan/Tilt/Zoom camera. A motor, not shown, effects the rotation of the driving pulley 110. If cable 160 is properly tensioned, a rotation of the driving pulley 110 causes a movement of the cable 160. The driven pulley 130 is rotated by the action of the movement of the cable 160. The idler wheels 120 allow for a change of direction of the cable, thereby allowing a rotation of the driving pulley about a vertical axis to be converted to a rotation of the driven pulley about a horizontal axis. As shown, this cable and pulley arrangement produces a tilt of a camera 101, which is axially attached to the driven pulley 130, in direct relationship to the rotation of the driving pulley.

Traditionally, the camera 101 is adjusted while the adjuster is viewing the scene within the camera's field of view. The motor which drives the driven pulley is energized to rotate in one direction or the other until the desired scene comes into view. In such a system, a precise correspondence between the rotation of the motor and the tilt of the camera is not required. As long as the slippage and the backlash of the cable is not excessive, the user can effect the relative motion of the camera to eventually produce the desired view, without regard to the absolute motion of the motor. That is, for example, assuming nominal slippage, the motor may turn 31 degrees clockwise to achieve a 30 degree change in camera angle, and only 28 degrees counterclockwise to achieve an opposite 30 degree change in camera angle. This difference in absolute measures would typically be caused by hysteresis, or backlash, as well as a difference in friction between the cable and the pulley in each direction. Such a difference, however, would be virtually undiscernible to an operator who is adjusting the camera by viewing the scene. Thus, in a traditional, manually controlled, system, the tension on the cable 160 would be merely the tension required to avoid a discernible hysteresis or slippage.

Shown in FIGS. 1A and 1B is a tension control mechanism 150. Such a tension control mechanism, common in the art, comprises a torsion spring, not shown. In FIGS. 1A and 1B, cable 160 is not a continuous loop; one end of cable 160 is fixedly attached to pulley 130, and the other end is attached to the tension control mechanism 150, which is fixedly attached to pulley 130. Tension control mechanism 150 applies tension to one end of the cable, which tension is equal and oppositely applied at the fixedly attached end. As discussed above, the amount of tension provided is typically the amount required to avoid noticeable slippage or backlash. Alternatively, as is known in the art, the idler pulleys 120 could be spring loaded so as to exert a force on the cable 160 in a direction away from the driving and driven pulleys.

Increasingly, camera angle adjustment means such as shown in FIGS. 1A and 1B are automated via computer control. Camera control systems allow for the setting of predefined camera views. The user adjusts the camera, via manual control, to a desired view. The user then instructs the camera control system to remember this view. At a later point in time, after subsequent changes to the camera view, the user instructs the camera control system to reposition the camera to the aforementioned remembered view. As compared to the human's repositioning of the camera based upon the view presented by the camera as it is moved, the camera control system effects this repositioning via precise commands to the motor which drives the driving pulley. As is evident in such a system, the ability to reposition the camera via commands to the motor necessarily implies an absolute correspondence between a rotation of the driving pulley and a rotation of the driven pulley. As is known in the art, the force which can be applied to rotate the driven pulley is limited by the frictional forces opposing the motion of the cable relative to the pulley. The traditional means of maintaining an absolute correspondence between a driving and a driven pulley is to significantly increase the tension in the cable between these pulleys, thereby increasing the frictional forces to oppose the relative motion, or slippage, of the pulley and the cable.

Figure 2A:
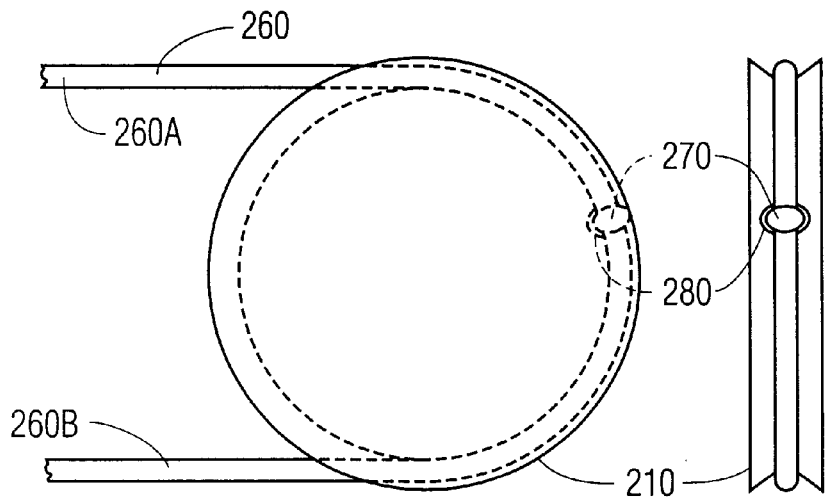
FIGS. 2A–2C shows a cable and pulley apparatus in accordance with this invention.
Figure 2B:
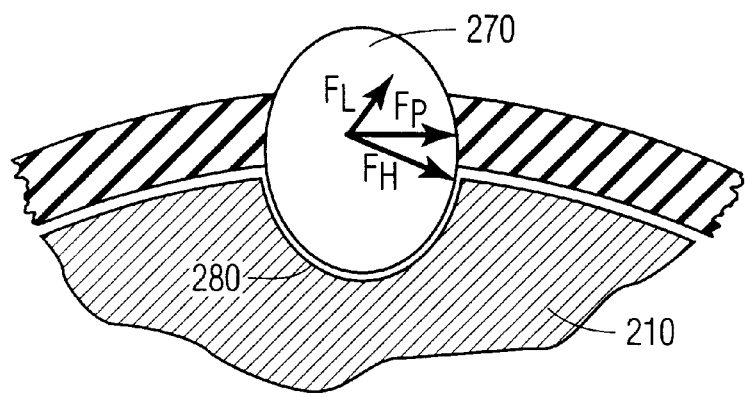
Figure 2C:
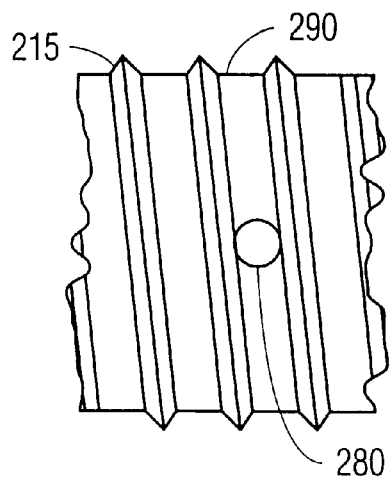

Shown in FIGS. 2A–2C is a pulley and cable arrangement which does not require a significant tension to maintain a relatively fixed correspondence between the cable and the pulley. The pulley 210 has a locator hole 280 for receiving a locator ball 270 which is fixedly attached to the cable 260. Assuming a minimal static tension holding cable 260 against pulley 210, a movement of cable 260, via a pulling force on the cable at 260a or 260b will result in a movement of the locator ball 270, which is fixedly attached to the cable, and a corresponding movement of pulley 210, due to the forces applied to the edge of the hole 280 by the surface of the ball 270. As detailed in FIG. 2B, the pulling force FP exerts a force FH against the edge of the hole 280, and a lifting force FL perpendicular to FH. These forces are dependent upon the relative size of the ball compare to the cable. Assuming a ball having at least twice the diameter of the cable, a significant portion of the pulling force is applied to move pulley 210. That is, by employing the locator ball, in accordance with this invention, the pulling force itself assures a corresponding movement of the pulley. The tension force required is merely that which is required to overcome the lifting force FL.

As compared to a fixed attachment of the cable to the pulley, the use of a locator ball provides the same amount of rotational correspondence, provided that the ball is not lifted from the hole. However, it provides a significant manufacturing, and serviceability advantage to a fixed attachment by merely requiring the cable to be laid about the pulley such that the ball and hole line up, rather than requiring a means of fixedly attaching the cable. As would be evident to one skilled in the art, the pulley 210 could contain multiple locator holes 280, to ease manufacturing or installation setup, by allowing the locator ball 270 to be placed in whatever hole was most convenient. Thereafter, the correspondence of the motion of the cable and pulley would be maintained, relative to that initial placement.

As would also be evident to one skilled in the art, the device as shown in FIGS. 2A–2C would maintain a correspondence between the movement of the cable and the movement of the pulley only while the locator ball is located on the perimeter of the pulley; i.e. through approximately 180 degrees of motion of the pulley. As would be evident to one skilled in the art, however, the amount of rotational movement can be extended by allowing for multiple turns of the cable about the pulley, as shown in FIG. 2C. Shown in FIG. 2C is a pulley 215 having a screw-like channel 290 which extends at least one full revolution on either side of the locator hole 280. If the cable 260 is wrapped around the pulley 215 for two full revolutions, with the locator ball 270 at the center of these two revolutions, the extent of rotation of the pulley would be +/−270 degrees, for a total of 540 degrees of rotation. If additional revolutions are provided by channel 290 and the cable 260 is corresponding additionally wrapped around the pulley 215, the extent of rotation can be extended.

Alternatively, if an unlimited span of rotation is required, a continuous loop of cable with multiple locator balls, appropriately spaced, could provide for limitless rotation. In this way, it is seen that the use of locator balls and holes provides an operational advantage over the fixed attachment of the cable to the pulley, which inherently has a fixed limit of rotation. The use of multiple locator balls and holes, does however, require a precise placement of the balls and holes relative to each other, to prevent slippage as each ball engages and disengages its corresponding hole. As discussed above, a single ball system, albeit limited in freedom of rotation, requires no such precision, because, once initially located in the hole, all subsequent rotations will be relative to that initial location, and no slippage can occur as long as the ball remains within the hole.

Figure 4A:
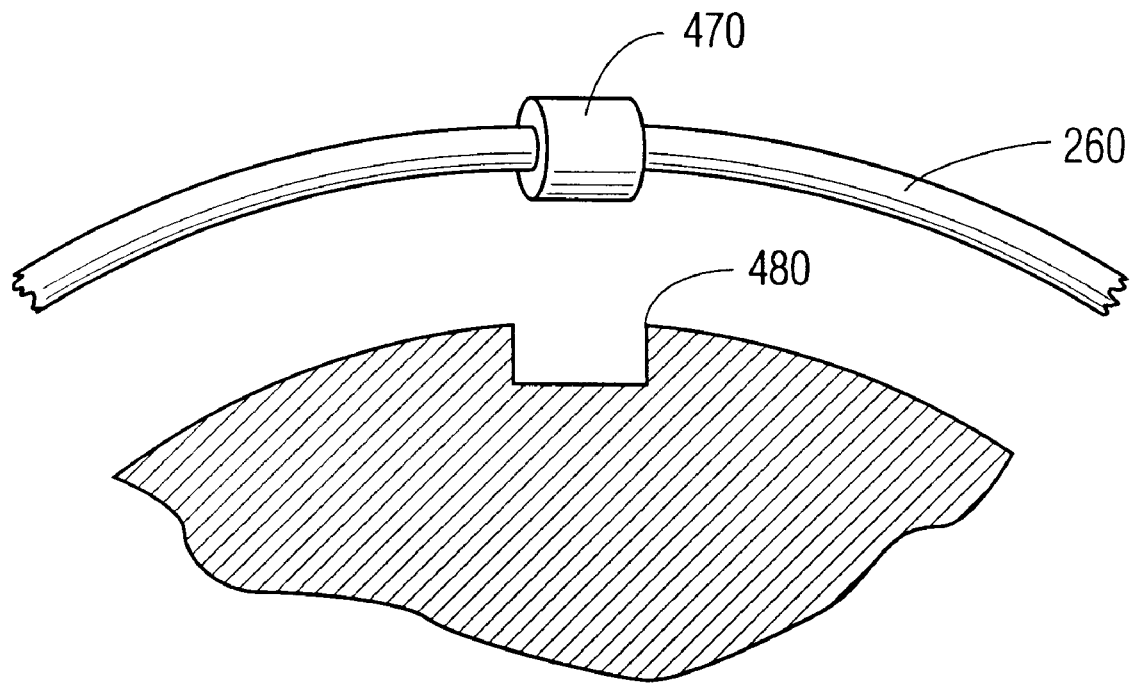
FIGS. 4A and 4B shows alternative cable locator pin arrangements in accordance with this invention.
Figure 4B:
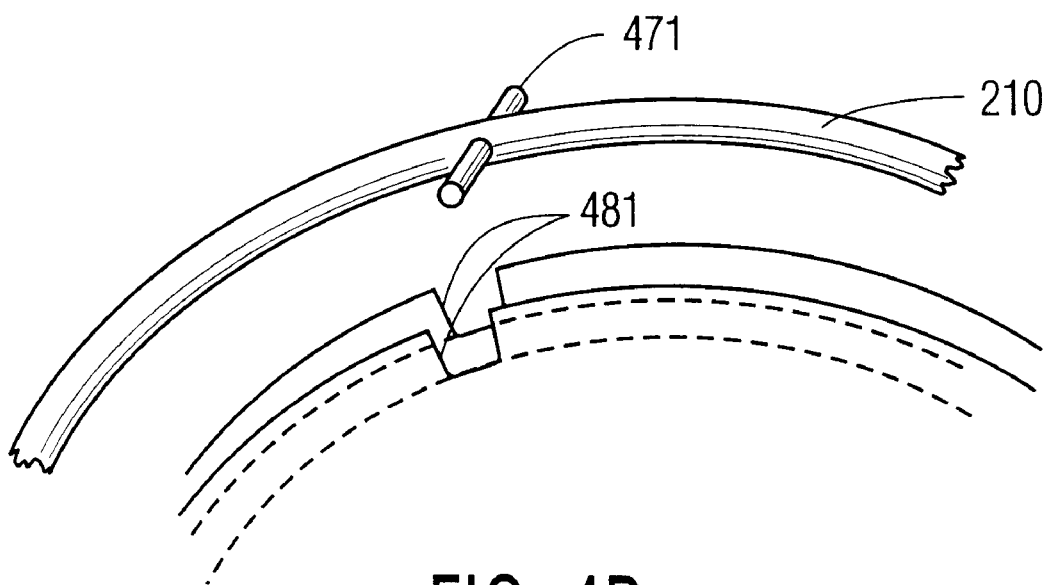

Although the locator item on the cable has been discussed thus far as being a ball, it is evident that alternative shapes could be employed. For example, for increased purchase, a cylindrical locator 470 could be fixedly attached to the cable 260, with a matching cylindrical hole 480 in the pulley, as shown in FIG. 4A. Similarly, a pin 471 could be inserted into the cable 260, traversing its diameter, and notches 481 placed in the outer rim of the pulley, suitably sized to receive the ends of the pin, as shown in FIG. 4B. These and other like means for securing a protuberance located on a cable to a pulley would be evident to one skilled in the art, and are within the scope of this invention.

Figure 3A:
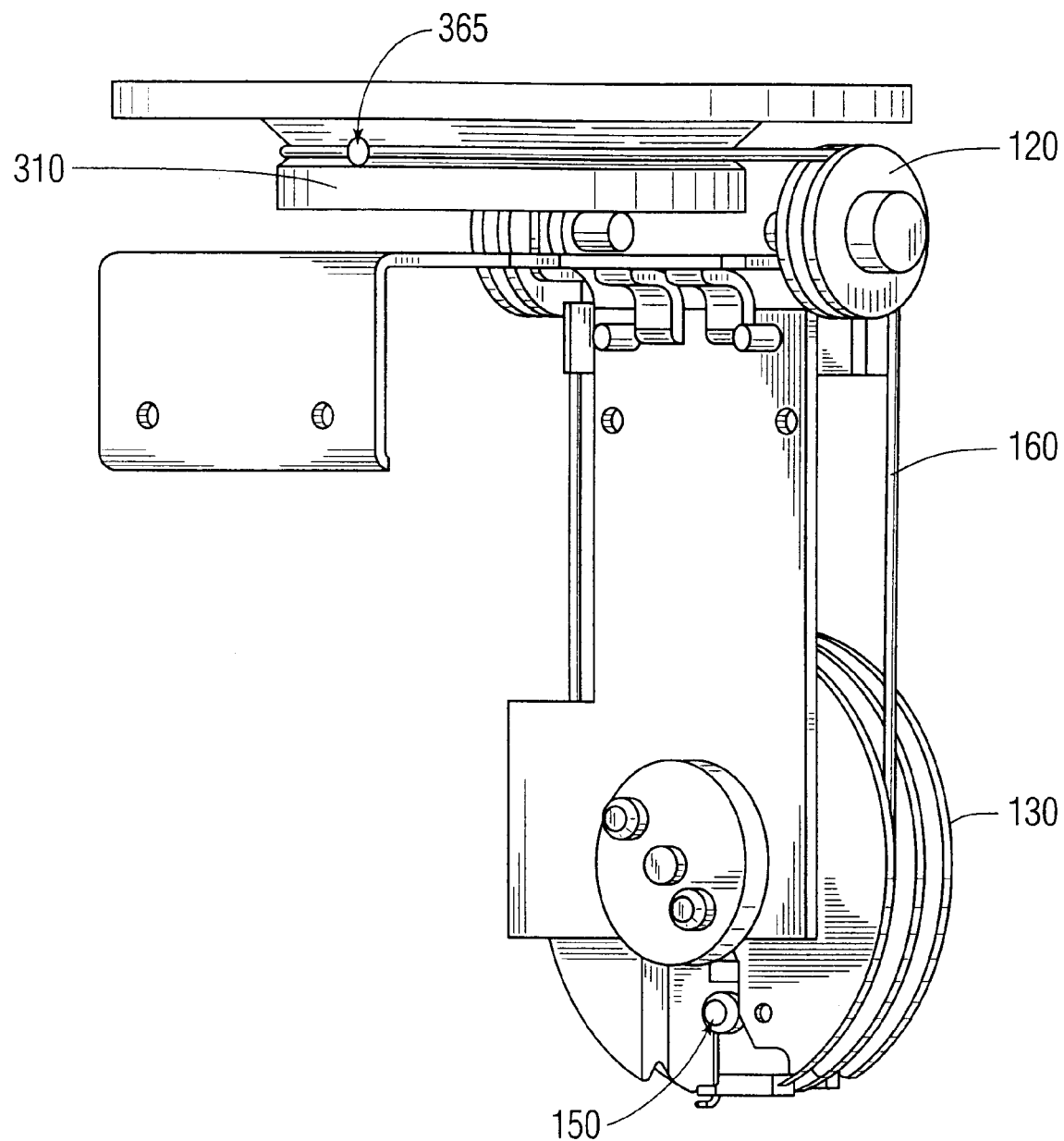
FIGS. 3A and 3B shows a cable drive for a Pan/Tilt/Zoom camera in accordance with this invention.
Figure 3B:
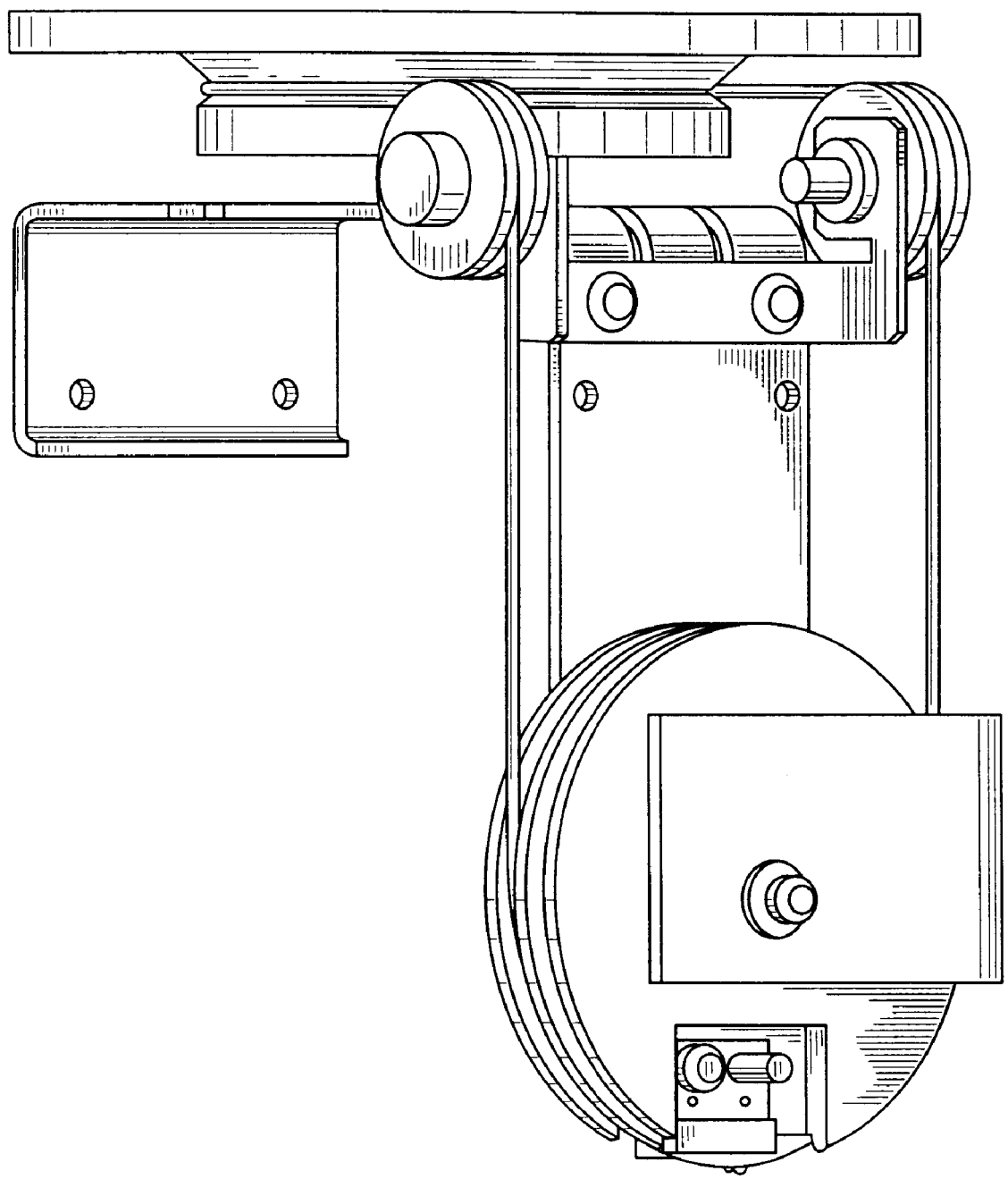

FIGS. 3A and 3B shows a Pan/Tilt/Zoom camera arrangement, similar to FIGS. 1A–1C, but with a locator ball and hole in accordance with this invention. Items in FIGS. 3A–3B which correspond to those in FIGS. 1A and 1B have the same reference numerals and function as described above. Shown is a locator ball 365 fixedly attached to the cable 160. The pulley 310 contains one or more holes for receiving the locator ball 365. Typically, because the tilt angle need only be varied between 0 degrees (horizontal) and 90 degrees (vertical), the locator ball is positioned such that, at midpoint of its traversal on pulley 310, the camera is oriented at 45 degrees. Pulley 130, having the cable fixedly attached, directly and via the torsion spring, is situated such that the fixed attachment points are midway about their traversal on pulley 130 when the camera is oriented at 45 degrees. Once the locator ball is situated on pulley 310, and the cable is tensioned, subsequent movements of pulley 310 will induce a corresponding movement in pulley 130, with no slippage; and, assuming that the locator hole is sized with sufficient precision relative to the size of the locator ball, with no backlash, or hysteresis. As would be evident to one skilled in the art, the cable may be, equivalently, fixedly attached to pulley 310 and the locator hole formed in pulley 130.

As previously mentioned, the torsion spring maintains sufficient tension on the cable to minimize the backlash caused by cable slack. To minimize the slack, the tension must be greater than the force required to move the load on the pulley 130. Typically, the load is balanced about the axis of rotation, and thus, the required tension force can be minimized. Alternatively, the idler wheels 120 could be tensioned to provide the cable tension. It is noted that, in accordance with this invention, high tension forces are not required to maintain the correspondence between the movements of the pulley and the cable, because the placement of the locator ball into the locator hole on the pulley provides the necessary fixed correspondence.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A positioning system comprising:

a first and at least a second pulley;

a cable strung between said pulleys;

said cable having at least one locator device; and said first pulley having a surface including a screw-like channel;

at least one receptor disposed in said screw-like channel for establishing a mating configuration with said at least one locator device;

said receptor and locator device mating and maintaining said mating configuration during operation of said positioning system.

2. The positioning system as claimed in claim 1 wherein said locator device and said receptor have a cross section that is one of rectangular and circular.

3. The positioning system as claimed in claim 1 wherein said locator device is a pin.

4. A camera orientation device comprising:

a driving pulley;

a driven pulley coupled to a camera;

a cable strung between said driving and driven pulleys;

said cable having at least one locator device disposed thereon; and one of said pulleys having, a surface including a screw-like channel;

a receptor disposed in said screw-like channel for establishing a mating configuration with said locator device;

said receptor and locator device mating and maintaining said mating configuration during operation of said positioning system.

5. The camera orientation device as claimed in claim 4 wherein said cable is fixedly attached to at least one of said pulleys.

6. The camera orientation device as claimed in claim 4 wherein said cable is fixedly attached to at least one of said pulleys through a torsional spring.

7. The camera orientation device as claimed in claim 4 further comprising at least one idle pulley, said cable being routed about said idle pulley.

* * * * *